July 13, 1965 E. J. RYMASZEWSKI 3,194,974

HIGH SPEED LOGIC CIRCUITS

Filed March 28, 1961 2 Sheets-Sheet 1

INVENTOR
EUGENE J. RYMASZEWSKI

BY Wesley De Bruin

ATTORNEY

United States Patent Office 3,194,974
Patented July 13, 1965

3,194,974
HIGH SPEED LOGIC CIRCUITS

Eugene J. Rymaszewski, Poughkeepsie, N.Y., assignor to International Business Machines Corporation, New York, N.Y., a corporation of New York
Filed Mar. 28, 1961, Ser. No. 98,574
12 Claims. (Cl. 307—88.5)

This invention relates to logical circuitry and, more particularly, to circuitry employing negative resistance devices for performing logical operations.

In the development of present-day digital computers, efforts are being concentrated on obtaining greater machine versatility at less expense. Since computer versatility is controlled to a large extent by the speed capabilities of a machine's circuits, developmental endeavors are being directed at obtaining increased circuit operating speeds (of the order of three to five nanoseconds, that is, 3 to $5\times10^{-9}$ seconds). This factor is particularly true in the case of circuits which perform the more time consuming complex logical operations, such as the sum modulo two adder function, and, as a result, simplification of these circuits is of prime concern, if their operating speeds are to be increased.

The sum modulo two adder function is ordinarily obtained from specific circuit arrangements of the basic logic blocks. In most instances, these blocks employ solid-state components, including transistors and semiconductor diodes. As is well known in the art, the transistor, when used as a switch (as is the case in logical circuitry), is inherently limited in its switching speed. Consequently, arrangements incorporating these logical blocks for performing the sum modulo two adder function have proved to be unsatisfactory in computing machines since they fail to meet the required switching speeds.

Attempts to reduce the inherent operating delays of the transistors utilized in the basic logic blocks have been directed toward modification of the internal makeup of the transistor itself, and other efforts have been devoted to modifying the external circuitry of the component to prevent or compensate for any delays. Illustrative of the work performed in the latter area are the inverting circuits of pending application Serial No. 835,943, filed August 25, 1959, in the name of Fred K. Buelow and now Patent No. 3,054,911 issued September 18, 1962. This invention is also in the latter area, enabling currently available semiconductor devices to be utilized in circuitry for performing complex logical operations at speeds heretofore not attainable.

Accordingly, it is an object of the invention to provide a simplified circuit arrangement which incorporates basic logic blocks for accomplishing the sum modulo two adder logical function.

It is a further object of the invention to provide a sum modulo two adder circuit which may be utilized to provide a true and/or an inverted output.

Still a further object of the invention is to provide a circuit for performing logical operations, such as inversion and/or signal amplification and level setting, which includes a semiconductor device having negative resistance characteristics.

In accordance with an aspect of the invention, there is provided a high speed logic circuit comprising a two-terminal device having a negative resistance region in its forward conducting characteristic and a unidirectional conducting device. The devices are connected in series in like polarity and means are provided for establishing a monostable load line for them. When a variable current input is applied to the two terminal device, the region of circuit operation on the characteristic curve is established and an output is derived from the circuit which depends on this operating region.

The foregoing and other objects, features and advantages of the invention will be apparent from the following more particular description of preferred embodiments of the invention, as illustrated in the accompanying drawings, wherein:

FIG. 4 is a circuit diagram of a logic circuit for performing the three-way sum modulo two adder function according to the principles of the invention;

FIG. 5 is a circuit diagram of a second example of a logic circuit for performing the three-way modulo-two adder function which provides a true and/or inverted output; and, FIG. 6 is a plot illustrating the volt-ampere input characteristics for the circuits of FIGS. 4 and 5.

Figures 1, 2:
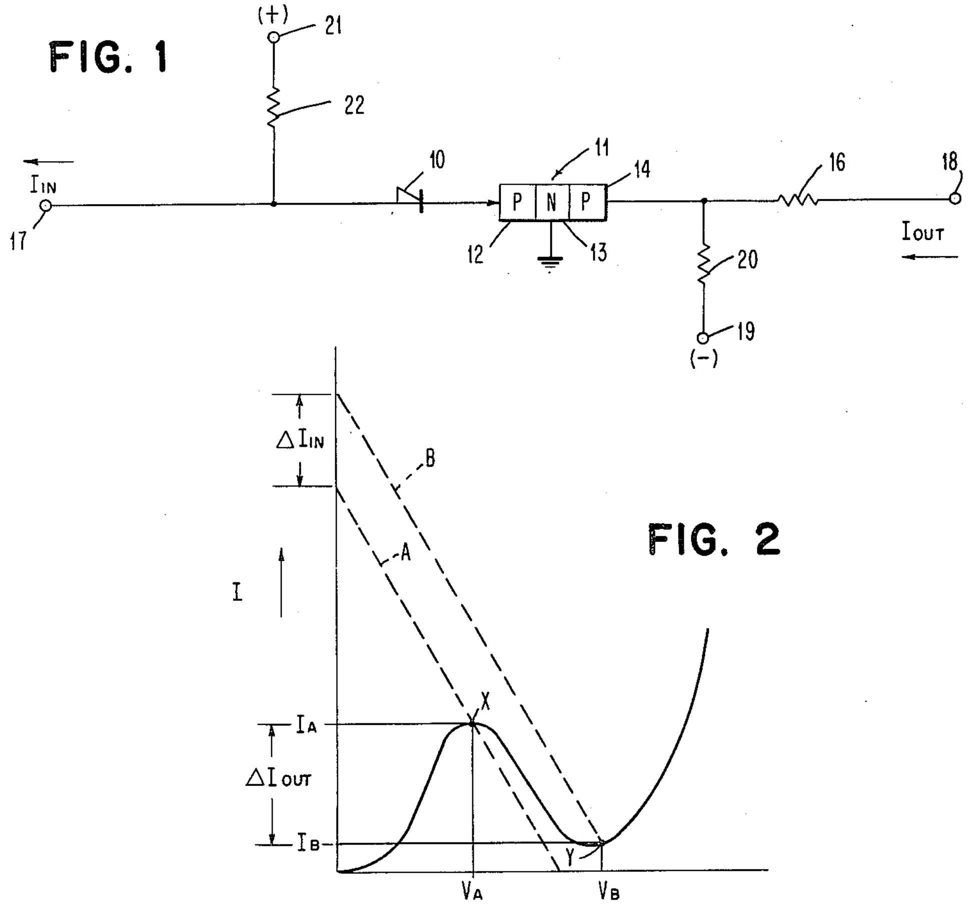
FIG. 1 is a circuit diagram of a basic inverting circuit according to the invention and utilizing a PNP type transistor.
FIG. 2 is a plot showing the input volt-ampere characteristic of the circuit of FIG. 1.

Referring now to FIG. 1, the novel circuit in its most basic form comprises a negative resistance device 10 connected in the emitter circuit of a transistor 11 which is of the PNP junction type having emitter, base and collector electrodes 12, 13, 14, respectively. The negative resistance device 10 is connected in like polarity to the transistor 11, so that the device 10, transistor 11, and an impedance, such as a resistor 16 form a series circuit between input and output terminals 17–18, respectively. Collector electrode 14 is biased through a resistor 20 from a negative voltage source (not shown) coupled to the terminal 19, and the anode electrode of the negative resistance device 10 is biased through the resistor 22 from a positive voltage supply (not shown) connected at the terminal 21. Current input $I_{in}$ is supplied at the terminal 17 to the anode electrode of device 10 and the output current $I_{out}$ is derived at the terminal 18. As thus shown, the input current is inverted by the circuit and derived at the output terminal 18 in inverted form at the voltage level of the input terminal 17, since resistor 16 is provided to adjust the voltage level at the output terminal 18 to that of the input terminal 17.

The volt-ampere characteristic of the combined configuration of the negative resistance device 10 and transistor 11 is shown in FIG. 2. It includes a negative resistance region in the forward conducting direction between the points X and Y, corresponding to the points of maximum and minimum current. As shown, if the voltage applied to the device 10 is increased through the region of negative slope, the current flow in the device decreases.

One such device which exhibits this characteristic is known as the tunnel diode. This device is a heavily doped junction diode capable of operating at speeds in the nanosecond range, and, therefore, is extremely compatible for use in transistor circuits. The negative resistance characteristic of the device is present in its forward conducting condition, the positive or anode electrode being the input terminal and the cathode or negative electrode the output terminal. A more detailed description of this device may be found in an article by Leo Esaki appearing in the Physical Review for January 15, 1958, entitled: "New Phenomenon in Narrow Germanium PN Junctions."

Referring again to FIG. 2, if it is assumed that the impedance and voltage values of the circuit, in its initial operation, provide a load line, such as that indicated at B, the input current to the device 10 is at a high level. Load line B intersects the characteristic curve at the point $I_B$, $V_B$, so that the output current $I_{out}$ is $I_B$. Since this current is at a low level, an inversion of the input current is provided. On the other hand, if the input current is decreased, the load line shifts to line A and the operating point of the circuit becomes $I_A$, $V_A$. The current flow in the configuration increases and the circuit output current is $I_A$. It is readily apparent that the input current has been inverted.

In addition, the change in the level of the output current from the first operating condition (load line B) to the second operating condition (load line A) is $\Delta I_{out}$. It is obvious that this is greater than the change in the input current ($\Delta I_{in}$) and, therefore, the configuration exhibits current amplification. Moreover, the circuit operates at the point $I_A$, $V_A$ as long as the input current is at the lower level. As it increases, the operating point automatically switches back to the point $I_B$, $V_B$.

Figure 3:
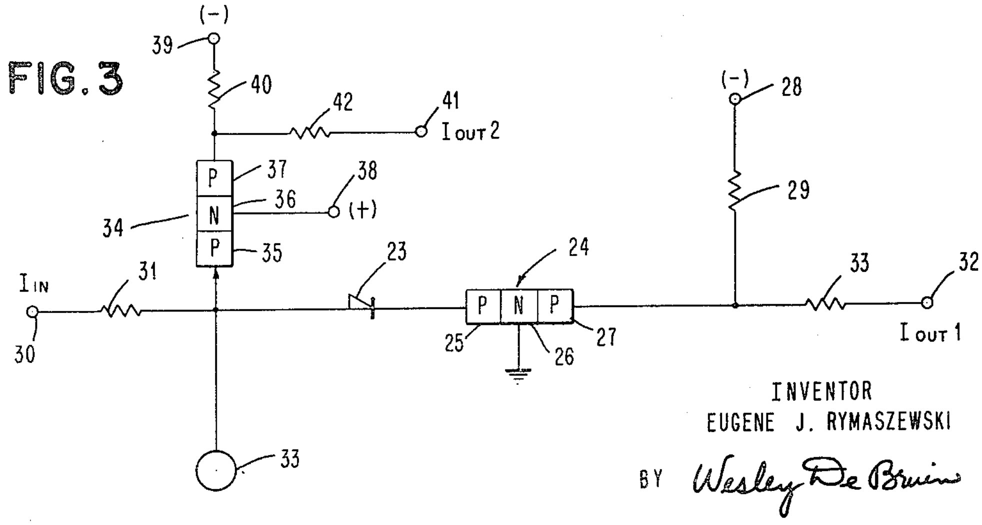
FIG. 3 is a circuit diagram of a modified form of the circuit of FIG. 1 for facilitating the provision of a complementary output.

In order to provide a complementary output to the inverted output of the circuit of FIG. 1, this arrangement may be modified to provide a true and/or an inverted output signal. As shown in FIG. 3, the negative resistance device 23 and transistor 24, having emitter, base and collector electrodes 25, 26 and 27, respectively, are comparable to the arrangement of FIG. 1. The collector electrode 27 of transistor 24 is biased through the resistor 29 from a negative supply which is coupled to terminal 28. The current input to the circuit is supplied at an input terminal 30 and is coupled to the negative resistance device 23 through a resistor 31. Similarly, the output current is derived from the circuit through a resistor 33 at terminal 32.

The resistor 22 and the positive voltage supply which is coupled to the terminal 21 in FIG. 1 are replaced by a constant current source 43. The load line for the input volt-ampere characteristic of the negative resistance device 23 is established by the input volt-ampere characteristic of a transistor 34, having emitter, base and collector electrodes 35, 36 and 37, respectively. The emitter electrode of transistor 34 is coupled to the anode electrode of the device 23 and bias is supplied to the base electrode 36 from a positive voltage supply (not shown) connected to terminal 38. The collector electrode 37 is biased through a resistor 40 from a negative voltage supply coupled to terminal 39.

In operation, as the input current $I_{in}$ supplied at the terminal 30 changes from a low level to a high level, the basic circuit operates in the same manner as described for the circuit of FIG. 1 to provide an inverted output signal $I_{out\,1}$ at the terminal 32. However, there is a redistribution of the current from the constant current source 43 between the transistors 24 and 34, so that a true or in-phase output $I_{out\,2}$ is obtained at a second terminal 41 which is coupled to the collector electrode of the transistor 34 through a resistor 42.

As thus constituted, the circuit embodiments of FIGS. 1 and 3 are capable of accepting a small input current and producing a substantially greater output current. Thus, the current gain provided by either of these circuits is sufficient to drive a plurality of other circuits. Moreover, the embodiment of FIG. 3 also provides an in-phase output as well.

Heretofore, a basic logic circuit for providing either a true or an inverted output signal has been described. This circuit may be modified to perform more complex logical operations. Specifically, this circuit may be adapted to provide true and/or inverted output signals for the sum modulo two adder logical expressions.

The three-way modulo-two adder expression for three signals, such as the signals A, B and C applied at the input terminals 59, 60 and 61, respectively, of FIG. 4, may be expressed as follows:

$$A \veebar B \veebar C = A\overline{B}\overline{C}+\overline{A}B\overline{C}+\overline{A}\overline{B}C+ABC$$

As shown in FIG. 4, a negative resistance device 50, such as the tunnel diode previously referred to, is serially connected in like polarity to a unidirectional conducting device, such as the conventional diode 51. The anode of diode 51 is ground connected and the cathode of the device 50 is coupled to a constant current source 52 and to the emitter electrode 54 of an NPN type transistor 53. The base and collector electrodes 55–56 of transistor 53 are biased through the resistors 66 and 58, respectively, from negative and positive voltage supplies (not shown) connected to terminals 65 and 57, respectively. The input signals A, B and C which are applied at the terminals 59, 60 and 61, respectively, are coupled through the resistors 62, 63, 64, respectively, to the base electrode 55 of transistor 53. These signals are in binary form, that is, they are expressed as either a binary "1" or a binary "0" indicative of either the presence or absence of a current input.

Referring to FIG. 6, the solid line indicates the combined volt-ampere characteristic curve of the serially connected negative resistance device 50 and the conventional diode 51. The input volt-ampere characteristic curve of the transistor 53 is the load line to this combined diode-device characteristic. This is shown by the dotted lines in FIG. 6. Each of the four positions of the dotted load line, indicated as being 0, 1, 2, 3, is determined by the corresponding number of input lines 59, 60, 61 where there is a signal applied (binary "1").

It is obvious from the expression given above for the sum modulo two adder function, that a true or in-phase output signal would be provided by the circuit if either any one or all three input signals are present. Similarly, if either no one or any two input signals are present, then there is no true output signal. However, in the configuration of FIG. 4, the input signals are applied to the base electrode 55 of transistor 53. The constant negative current Io supplied by the source 52 is distributed between the transistor 53 and the device 50 and diode 51, dependent on the base potential of the transistor 53. Therefore, the output derived from the circuit at terminal 67 connected to collector electrode 56 is the complement (in inverted form) of this true output signal. Consequently, this circuit provides an output $I_{out}$ if either no one or any two input signals are present.

As thus described, the circuit of FIG. 4 provides a single output which is the complement of the sum modulo two adder function. By substituting a transistor for the conventional diode 51 of this circuit an inverted and/or an in-phase output may be obtained from the circuit. In FIG. 5, a transistor 68, having base, emitter and collector electrodes 69, 70, 71, respectively, is substituted for the diode 51 of FIG. 4. The transistor 68 is connected in like polarity at the emitter electrode 69 to the negative resistance device 50. The base electrode 70 is ground connected and bias for the collector electrode 71 is supplied at the terminal 72 and through a resistor 73. The second output or true output is obtained at the terminal 74.

For the circuit arrangement of FIG. 5, the combined input characteristic is essentially the same as that shown in FIG. 6 by the solid line, and, therefore, the operation of the circuit, especially the operation of the transistor 53, is the same as that described for the circuit depicted in FIG. 4. The current flow in the transistor 68 complements that of the transistor 53, and, hence, the output obtained at the terminal 74, $I_{out\ 2}$, is a true or in-phase output for the sum modulo two adder function, whereas the output obtained at the terminal 67, $I_{out\ 1}$, is the complement of the sum modulo two adder function.

This circuit thus provides a three-way modulo-two adder in a one stage operation. In addition, it can operate as a two-way sum modulo two adder circuit, true or inverted, by applying a fixed potential (either 0 or 1) to one of the input lines. Moreover, if two of the input lines A, B or C, have fixed potentials then the circuit acts either as an inverter or an amplifier, such as that described in the embodiments of FIGS. 1 and 3.

While the invention has been particularly shown and described with reference to preferred embodiments thereof, it will be understood by those skilled in the art that various changes in form and details may be made therein without departing from the spirit and scope of the invention. For example, the circuits of the invention have been described as utilizing semiconductor elements of one polarity type or the other. However, it should be understood that the opposite polarity type elements may be utilized by making appropriate changes in the biasing circuitry associated with them.

What is claimed is:

1. A high speed logic circuit, comprising a two terminal device having a negative resistance attribute in the forward conducting region, a unidirectional conducting device including at least one rectifying diode, means series connecting in like polarity one terminal of the first mentioned device to the unidirectional conducting device, said devices having a combined volt-ampere characteristic with a negative resistance attribute in the forward conducting region, means to establish a monostable operating load line for the combined volt-ampere characteristic of said devices, means for providing a variable current input signal to the other terminal of said first mentioned device, so that as said input signal varies the region of circuit operation varies, and means for deriving an output signal determined by the region of circuit operation from said circuit.

2. The circuit according to claim 1, wherein the load line establishing means includes a fixed impedance coupled to said other terminal of said first mentioned device.

3. The circuit according to claim 2, wherein said load line establishing means also includes a variable impedance responsive to the variable current input signal to vary its impedance.

4. The circuit according to claim 3, and further comprising means for deriving a second output signal from said circuit determined by the region of circuit operation, said last named means being coupled to said variable impedance and providing an output signal in-phase with said input signal.

5. The circuit according to claim 1, wherein said unidirectional conducting device comprises a transistor connected in grounded base configuration with its emitter electrode connected to said negative resistance device.

6. A high speed logic circuit, comprising a two terminal device having a negative resistance attribute in the forward conducting region, a transistor having base, emitter and collector electrodes connected in grounded base configuration, means coupling said emitter electrode in like polarity to one terminal of said device, said device and transistor having a combined volt-ampere characteristic with a negative resistance attribute in the forward conducting region, means to establish a monostable operating load line for said combined volt-ampere characteristic, means for providing a variable current input signal to the other terminal of said device, so that as said input signal varies the region of circuit operation varies, and means for deriving an output signal determined by the region of circuit operation from said circuit.

7. The circuit according to claim 6, and further comprising means for deriving a second output signal from said circuit determined by the region of circuit operation, one of the output deriving means providing an inversion of the current input and the other of the output deriving means providing the complement of said inversion.

8. The circuit according to claim 7, wherein said means to establish a load line comprises a second transistor having base, emitter and collector electrodes, said second transistor being connected in opposite polarity at said emitter electrode to the unconnected terminal of said device, said output deriving means being coupled respectively to the collector electrodes of said transistors.

9. A high speed logical circuit for providing an output signal indicative of the sum modulo two logic function from a three-way current input signal, each way of said input signal being expressed in binary form as a ONE or a ZERO, indicative of the presence or absence of an individual input signal, comprising a two terminal device having a negative resistance attribute in the forward conducting region, a unidirectional conducting device including at least one rectifying diode, means series connecting in like polarity one terminal of the first mentioned device to the unidirectional conducting device, said devices having a combined volt-ampere characteristic with a negative resistance attribute in the forward conducting region, means to establish a monostable operating load line for said combined volt-ampere characteristic, the position of said load line with respect to said characteristics depending on the number of individual ONE and ZERO input signals of said current input signal, means including a signal responsive device having emitting, collecting and control electrodes for establishing said load line position, said emitting electrode being coupled to the other terminal of said device and said control electrode being responsive to said current input signal, and means for deriving an output signal determined by the position of said load line with respect to said characteristic from said circuit.

10. The circuit according to claim 9, wherein said output signal is the true sum modulo two expression for a three-way input signal.

11. The circuit according to claim 9, wherein said output signal is the complement of the sum modulo two expression for a three-way input signal.

12. The circuit according to claim 9, and further comprising means for deriving a second output signal determined by the position of said load line, with respect to said characteristic from said circuit, said unidirectional conducting device comprising a transistor having its emitter connected to the negative resistance device, its base grounded and its collector coupled to said means for deriving said second output signal, said second output signal being the true sum modulo two expression for a three-way input signal and the first output signal being the complement of said expression.

References Cited by the Examiner

UNITED STATES PATENTS

| | | | |
|---|---|---|---|
| 2,987,630 | 6/61 | Schreiner | 307—88.5 |
| 3,019,981 | 2/62 | Lewin | 307—88.5 |
| 3,115,585 | 12/63 | Feller et al. | 307—88.5 |
| 3,125,674 | 3/64 | Rabinovici et al. | 307—88.5 |

OTHER REFERENCES

Amodei: RCA Technical Note 434, January 1961 (2 pages) (page 1 relied on).

Amodei: RCA Technical Note 435, January 1961 (2 pages) (page 1 relied on).

Amodei et al.: "R.C.A. Technical Note No. 438," January 9, 1961 (3 sheets relied on).

Army TM 11–690, March 1959 (page 47 relied on).

(Other references on following page)

OTHER REFERENCES

Chaplin: 1961 International Solid-State Circuits Conference, February 1961 (pages 40, 41) (page 41 relied on).

Chow: "Tunnel Diode Logic Circuits," Electronics, June 1960, (pages 103–107) (pages 103, 104 relied on).

Galluppi: IBM Technical Disclosure Bulletin, vol. 1, No. 2, August 1958 (page 40).

Hunter: Handbook of Semiconductor Electronics, McGraw-Hill, 1956 (pages 18–5 and 18–6 relied on).

Levine et al.: IBM Technical Disclosure Bulletin, vol. 6, No. 12, May 1964 (page 10).

Neff: 1960 International Solid-State Circuits Conference (pages 16, 17) (page 17 relied on).

Walsh: "Symmetrical-Transistor Steering Circuit," IBM Journal, April 1957 (pages 185–188) (page 185 relied on).

HERMAN KARL SAALBACH, *Examiner.*

ARTHUR GAUSS, *Primary Examiner.*